Oct. 1, 1968   J. M. HOFF   3,403,993
SHAPED BLOCK OF A SUBLIMABLE MATERIAL CONTAINING ROOT
KILLING COMPOUNDS FOR USE IN SEWER LINES
Filed July 30, 1965
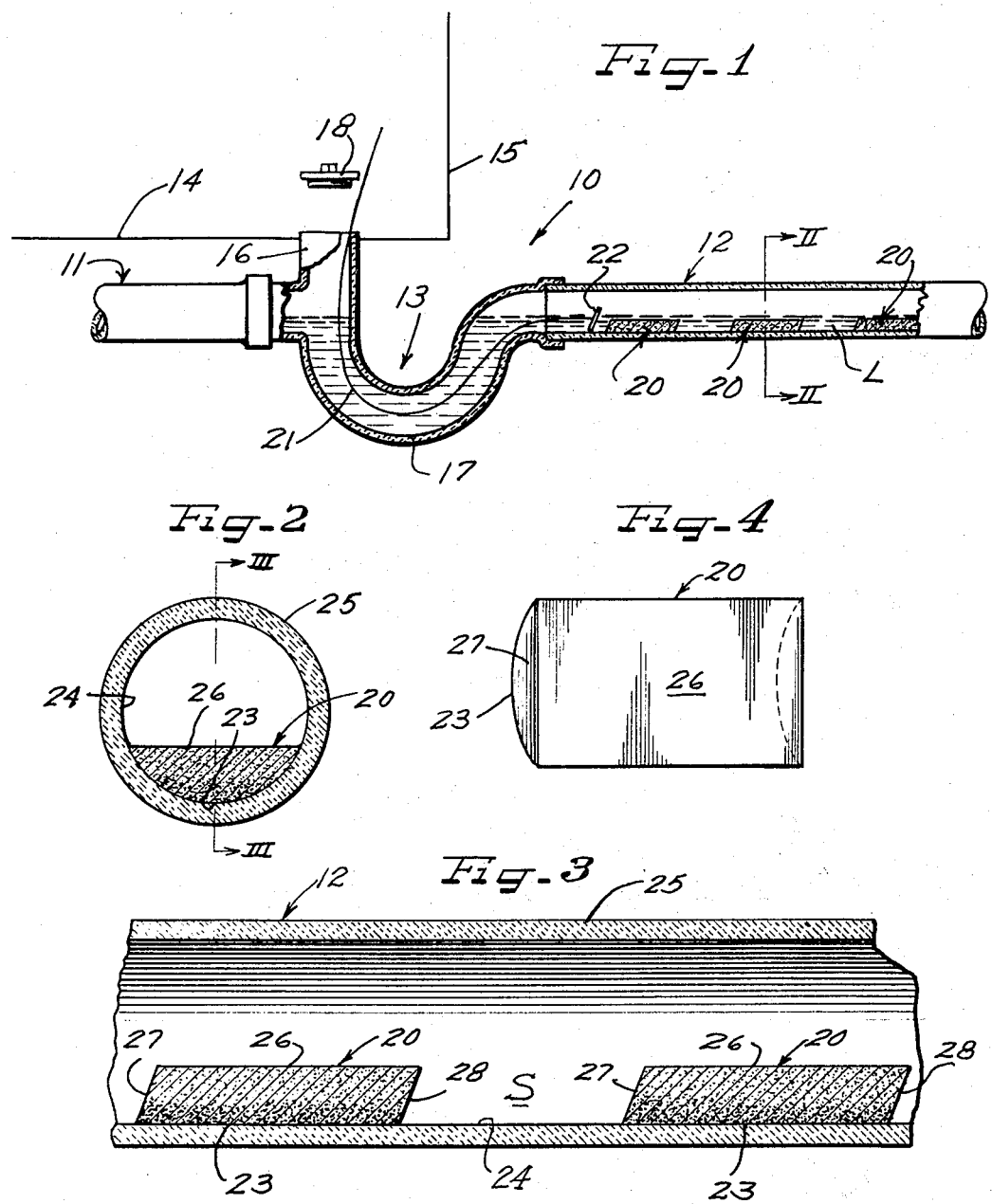
INVENTOR.
Jean M. Hoff
BY  ATTORNEYS United States Patent Office 3,403,993
Patented Oct. 1, 1968

3,403,993
SHAPED BLOCK OF A SUBLIMABLE MATERIAL CONTAINING ROOT KILLING COMPOUNDS FOR USE IN SEWER LINES
Jean M. Hoff, Racine, Wis., assignor to Hoff Chemical Corporation, Flat Rock, Mich., a corporation of Delaware
Filed July 30, 1965, Ser. No. 476,115
4 Claims. (Cl. 71—65)

ABSTRACT OF THE DISCLOSURE

A method and means for inhibiting root growth in sewer lines whereby formed blocks of a composition having a sublimable matrix material, for example, naphthalene, paradichlorobenzene, camphor and camphene, an active root-killing ingredient, for example, acetate, borax and cupric sulfate and a denser material for example, copper, lead and barium sulfate, along the bottom surface thereof are placed in spaced relationship along the sewer lines to form partial dam structures therein so that pools of poisoned sewer liquid are formed. The matrix material of the blocks is only slightly soluble so that such blocks remain active in the sewer lines for considerable periods of time and inhibit root growth therein.

---

This invention relates to a method of and a means for controlling root growth, and more particularly for retarding root growth in sewer lines that are susceptible to the intrusion of roots into the lines. My invention is most suitably embodied in a preformed block of a composition having an active ingredient capable of killing roots or of retarding their growth. In order to insure, so far as possible, the placement and retention of the blocks in a sewer line with the blocks in spaced relationship to form partial dams therein along the length of the sewer line, each of the blocks is of a preformed shape adapted to cause the block to rest against the inside of a sewer line and not be too readily displaced therefrom. In this way, concentrations of the active root-killing ingredient can be established in the sewer line between the partial dams formed by the blocks of the root-killing composition.

The method of my invention, therefore, constitutes an improvement over the prior art methods in which root-killing or root-growth-retarding compositions have been flushed into the sewer line through commodes or traps, or placed in the flush tank. These prior art methods are substantially "one-shot" treatments, whereas the present method provides a treatment that extends over a considerable length of time for each placement of the blocks within the sewer line, and such placements can be repeated, as needed.

Is is accordingly, an important object of the present invention to provide a method of and means for inhibiting root growth within sewer lines by locating therein preformed blocks of a root-killing or root-growth-inhibiting composition especially adapted to be placed at and retained within the sewer line at spaced intervals downstream of the trap in the sewer line that is always provided between the interior and the exterior portions of a sewer line system.

It is a further important object of this invention to provide a preformed block of a root-growth-inhibiting composition, particularly adapted as to its shape, form and dimensions to the practice of the foregoing method.

It is a further important object of this invention to provide a composition for this purpose that includes a matrix of a readily sublimable material, such as naphthalene, and an active root-killing ingredient, such as water soluble copper salt distributed throughout the matrix, together with high-density particulate material distributed within the matrix over a concentrated portion thereof adjacent the surface that is to rest upon the interior surface of the sewer line, thereby enhancing the likelihood that the preformed blocks will assume the desired spaced relationship within the sewer line and remain in such relatively spaced relationship as partial dams to build up more or less quiescent pools of the sewer liquid therebetween.

Other and further important objects of this invention will become apparent from the following detailed description of the annexed sheet of drawings, which by way of preferred example only illustrates the principles of my invention.

On the drawings:

FIG. 1 is a more or less diagrammatic view of a portion of a sewer line including the interior portion of the system at the building line and an external portion of the system, illustrating the practice of my invention by the location in such system of blocks of a root-killing or a root-growth-retarding composition at spaced points downstream of the trap connection.

FIG. 2 is an enlarged sectional view taken substantially along the line II—II of FIG. 1.

FIG. 3 is a longitudinal sectional view taken substantially along line III—III of FIG. 2.

FIG. 4 is an enlarged top plan view of a preformed block embodying my invention.

As shown on the drawings:

The reference numeral 10 indicates generally a sewer line system that includes an inner sewer discharge pipe 11, an external sewer line 12 and a trap 13 connecting the internal and external portions of the sewer system. Said trap 13 is shown in conjunction with a building, the outlines of which are indicated by a line 14 representing the basement floor line and a vertical line 15 representing an external wall of the building. Said trap may be of the conventional goose-neck type, with the discharge sewer line 11 connected into an upright leg 16 at a point below the basement floor level 14 and with the external sewer line 12 forming a continuation beyond the U-bend 17. As is customary, a threaded closure member 18 serves to close the upper end of said upright leg 16 that extends above the basement floor level 14.

In accordance with the principles of my invention, a plurality of blocks, indicated generally by the reference numeral 20, of my root-killing or root-growth-retarding composition are positioned within the external sewer line 12 downstream from the trap 13. While the placement of the blocks 20 within the sewer line 12 can be accomplished in a variety of ways, one relatively simple way is to open up the leg 16 of the trap by removing the closure member 18 and dropping the blocks 20 one-at-a-time into the U-bend 17, pushing the blocks successively out of the trap into the line 12. For this purpose, one may use a relatively stiff wire 21 having at its free end a pusher member 22, and by means of such wire and pusher member push one block at a time through the trap and into position in the external line 12. The first of a plurality of blocks is preferably pushed further along the line 12 than the next successive blocks, and a space indicated by the reference character S is left between the successive blocks. In this way, perhaps a half dozen blocks will be installed within the external sewer line 12 at suitably spaced intervals therealong. The amount of spacing is not important but there should be sufficient space provided between successive blocks, as will be explained more in detail later on herein, to provide relatively quiescent liquid pools within which a concentration of the active root-killing or root-retardng ingredient can build up.

Each of the blocks 20 is of a size and shape adapted to facilitate the carrying out of the method of my invention. To this end, each block is preformed with a longitudinally extending lower surface 23 that is of generally segmental-cylindrical contour and of a radius of curvature such that the surface 23 will, in general, conform to the inner surface 24 of the sections of pipe 25 making up the external sewer line 12. The upper surface 26 of each block 20 is preferably a plane surface, although it may be either convex or concave as desired. The one of the end faces of the block 20 that is to form the leading end, indicated by the reference numeral 27, when placed in the sewer pipe, slopes upwardly from the lower convex surface 23 to partially overlie the same. Such a sloping, leading face reduces the tendency of the block to be carried along with the flow of sewage within the pipe 25. The other end of each block 20, indicated by the reference numeral 28, will also have an end face lying in a plane parallel to the plane of the leading end face 27, if, as is most convenient, the blocks 20 are cut from a single elongated slab of the composition.

In the manufacture of the blocks, for instance, the composition can be cast in slabs several feet in length and then cut into blocks, or cakes, with the sloped faces already described. Preferably, each block 20 should be of a length greater than that of the internal diameter of the sewer pipe 25 within which the block is to be placed, and for the usual 4-inch sewer pipe, the length of the block might be 6 inches. Other than that they preferably be of a length equal at least to the internal diameter of the sewer pipe, there is nothing critical about the length of these blocks, but a block of less than about 3 inches is so small as to be used up unnecessarily rapidly, while a block of more than about 7 and one-half or 8 inches might be too long to push through the U-bend of the trap easily. With respect to the maximum thickness of each of the blocks 20, that, as well as the other dimensions, will depend upon the size of the sewer pipe in which the block is to be used, but, in general, the maximum thickness will be in the neighborhood or 1 inch for a 4-inch sewer pipe, and may vary from about one-half to one and one-half inches in maximum height.

The composition used in forming the blocks 20 should include an effective active ingredient capable of killing the roots that may force their way into the sewer line, or of at least retarding or inhibiting the growth of such roots within the sewer system. Active root-killing ingredients include the water soluble salts of copper, such as copper acetate, copper sulfate and other cuprous and cupric compounds having sufficient solubility in water to give an effective concentration of copper ions therein. Salts of boron, including the borates, borax, and the like, have root-retarding and even root-killing properties when in sufficient concentration.

In forming one of the blocks 20, as by casting, a dry mix is first made of the selected root-killing ingredient and a material capable of subliming at ambient temperatures, such as naphthalene, which sublimes both above and below its melting point of about 80° C.; paradichlorobenzene, which also sublimes at temperatures above and below its melting point of approximately 53° C.; camphor, having a melting point of about 178.5° C.; and camphene, having a melting point of about 50° C., both of which sublime at room temperatures and pressures. All of these sublimable materials have relatively low solubility in water, of the order of less than about 0.1 gram per 100 ml. of water and are, therefore, essentially unaffected by, and inert to, the dissolving action of the water. Being easily sublimable, however, at the temperatures obtaining within sewer systems, the naphthalene or other sublimable material dissipates sufficiently rapidly to permit dissolution of the soluble active ingredient at the desired rate to build up a concentration of the active ingredient within the sewerage liquid that will at least inhibit root growth therein.

In its preformed condition, therefore, each block 20 comprises a matrix of the sublimable material having distributed more or less uniformly therethrough the active root-killing ingredient.

As to the proportions of the ingredients of the composition of my invention, they may be varied from one part of active ingredient of three parts of matrix material, to three parts of active ingredient to one part of matrix material. A suitable composition, for example, is equal parts by weight of a water soluble copper compound, such as cupric acetate, and of naphthalene, or paradichlorobenzene.

The preferred composition of my invention also includes a high-density material in particulate form, concentrated at or near the lower surface 23 of each block so as to weight the block and tend to hold it in place in the sewer line. As examples of suitable high-density material, discrete particles of copper, such as metallic copper, wire cut into short pieces; barium sulfate; lead in the form of lead shot, or the like, have been found to the satisfactory. The high-density material in powdered or particulate form, or as short lengths of wire or rod, can be incorporated in the dry mix of the matrix and active ingredient, or can be added to the mix after melting the same, since in either event the high-density material will become concentrated by reason of its greater weight toward the bottom of the cast slab or other form into which the composition is cast or molded. The end result is that the concentration of the high-density material near the lower surface 23 of the final block will tend to keep said surface as the undersurface and to help retain the block in place within the sewer line.

The number and size of the cakes 20 that are used at any one time in a sewer line will, of course, depend upon the conditions presented, such, for example, as the size of the sewer pipe and, the volume of flow through the pipe. By way of illustration, if a 4-inch line from an ordinary family dwelling house is involved, a total weight of blocks 20 of approximately 3 lbs. should provide a root-growth-inhibiting effect lasting over a period of several years. Owing to the partial damming effect of these successive blocks 20, as illustrated in FIG. 1, more or less quiescent pools of liquid, indicated by the reference character L, will form, within the spaces S between successive blocks 20, and a sufficient concentration of the active ingredient will build up in these pools L to effectively inhibit root-growth at that point. The more or less concentrated solution of the active ingredient in the pools L will not tend to be flushed out so readily as would be the case if only a single block were used in the entire external sewer line. Also, the sloping leading faces 27 of the blocks serve to direct the flow of the sewerage stream over the tops of the blocks, with the result that relatively little of the stream forces its way to the bottom of the sewer pipe between successive cakes.

In those cases where my system is installed after clearing out a clogged-up situation in a sewer system, the contractor who has done the work can be reasonably confident that the installation of my system will guarantee freedom from further root troubles for at least a year. In contrast, no guarantee can properly be made following a one-shot treatment with copper sulfate solution, or the like, which is the present conventional method used.

It will be understood that modifications and variations may be effected without departing from the scope of the novel concepts of the present invention.

I claim as my invention:

1. A formed block of a composition having root killing properties for placement in a sewer line, said block having a longitudinally extending surface arcuated in transverse section for substantially conforming contact with the inner surface of said sewer line, said block consisting essentially of a matrix of a sublimable material selected from the group consisting of naphthalene, paradichlorobenzene, camphor, camphene, and mixtures thereof, an active root killing ingredient selected from the group consisting of cupric acetate, cupric sulfate and mixtures thereof distributed uniformly throughout said matrix, the proportions of root killing ingredients to sublimable material being in the range of 1:3 to 3:1, and a high-density material selected from the group consisting of metallic copper, barium sulfate, lead and mixtures thereof concentrated near the lower portion of said longitudinally extending surface in amounts sufficient to retard the movement of said block in said sewer line.

2. A formed block as defined in claim 1 wherein the sublimable material is naphthalene.

3. A formed block as defined in claim 1 wherein the active root killing ingredient is cupric acetate.

4. The method of retarding root growth in sewer lines which comprises forming a plurality of blocks having a lower surface generally conforming to the inner contour of the sewer line, said blocks consisting essentially of a matrix of a sublimable material selected from the group consisting of naphthalene, paradichlorobenzene, camphor, camphene, and mixtures thereof, an active root killing ingredient selected from the group consisting of cupric acetate, cupric sulfate and mixtures thereof distributed uniformly throughout said matrix, the proportions of root killing ingredients to sublimable materials being in the range of 1:3 to 3:1, and a high-density material selected from the group consisting of metallic copper, barium sulfate, lead and mixtures thereof concentrated near said lower surface of said blocks in amounts sufficient to retard the movement of said blocks in said sewer lines and introducing said blocks in spaced relationship into the interior of said sewer lines whereby said blocks form partial dams within the sewer line.

References Cited

UNITED STATES PATENTS

| | | | |
|---|---|---|---|
| 2,251,080 | 7/1941 | Taber | 206—0.5 |
| 2,397,328 | 3/1946 | Ripley | 134—22 |
| 2,449,731 | 9/1948 | Therrien | 285—115 |
| 2,976,191 | 3/1961 | Weston | 134—24 |
| 3,219,368 | 11/1965 | Crumpler | 285—285 |
| 3,219,433 | 11/1965 | Brewster et al. | 71—64 |

FOREIGN PATENTS 579,199   7/1946   Great Britain.

ELBERT L. ROBERTS, *Primary Examiner.*

M. M. KASSENOFF, *Assistant Examiner.*